Feb. 5, 1952 G. DUYCK 2,584,116
ELECTROMAGNETIC SYNCHRONIZER
Filed April 2, 1948 3 Sheets-Sheet 1
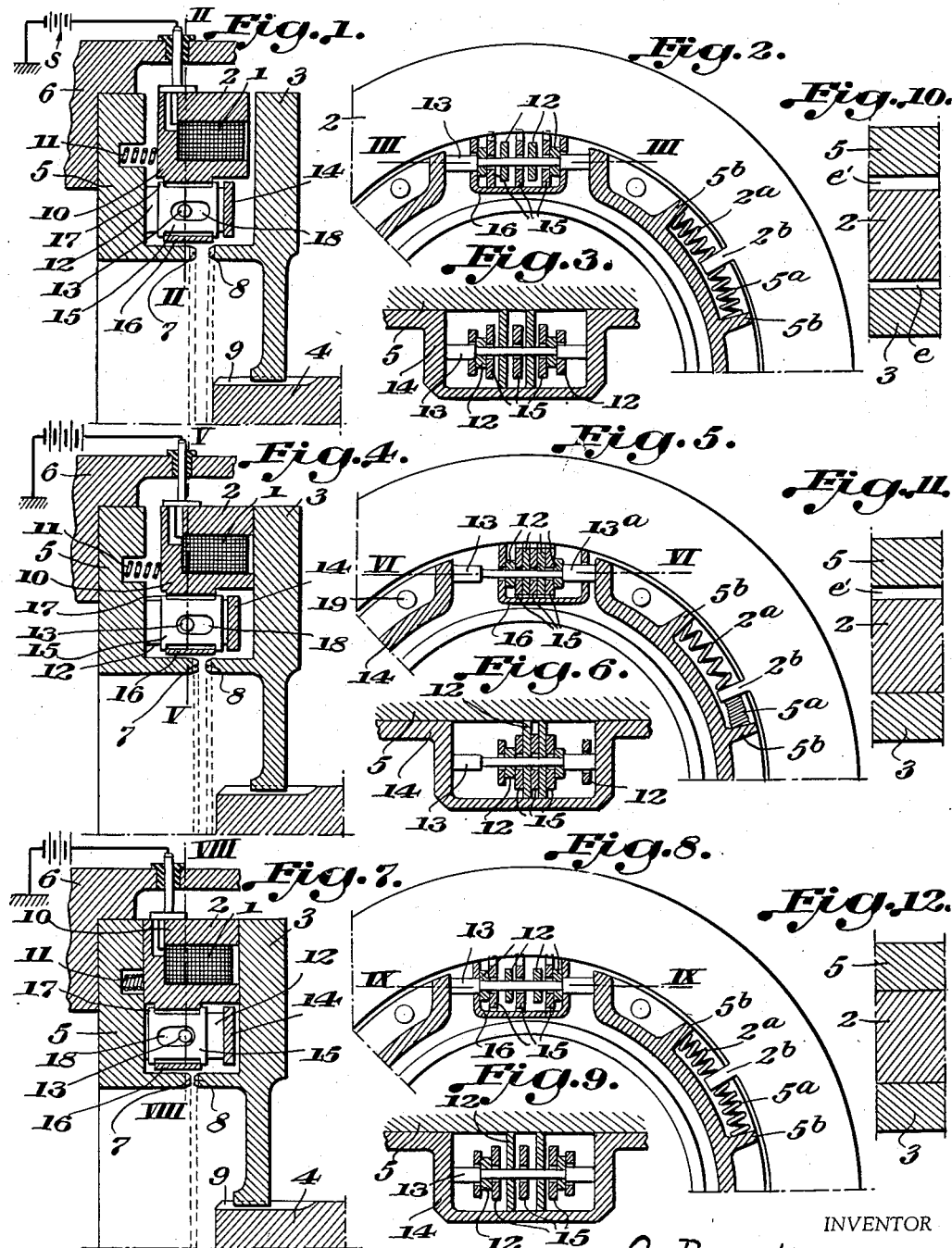
INVENTOR
G. Duyck
BY Wenderoth, Lind & Ponack
ATTORNEYS

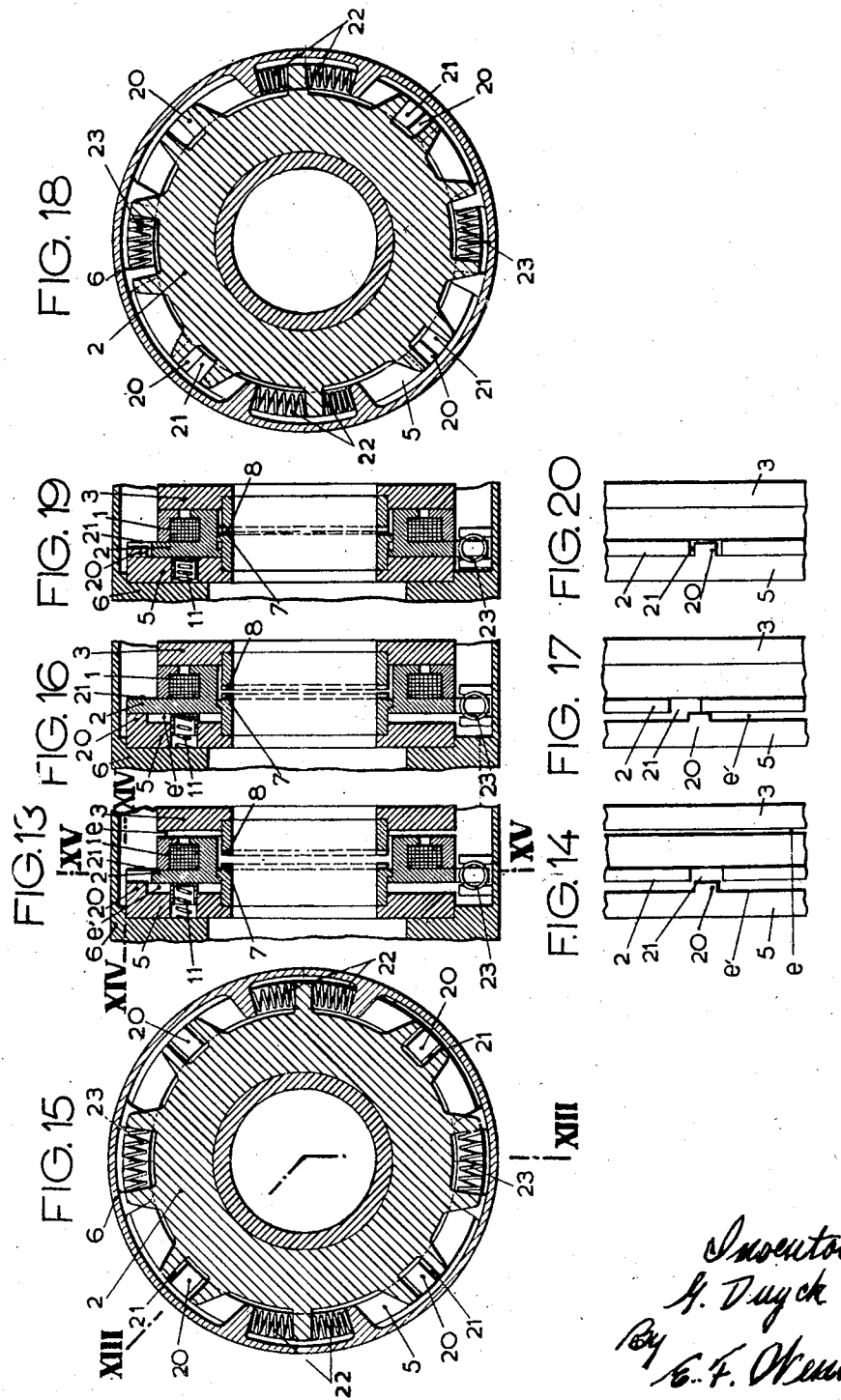

Feb. 5, 1952           G. DUYCK           2,584,116
ELECTROMAGNETIC SYNCHRONIZER
Filed April 2, 1948                         3 Sheets-Sheet 3
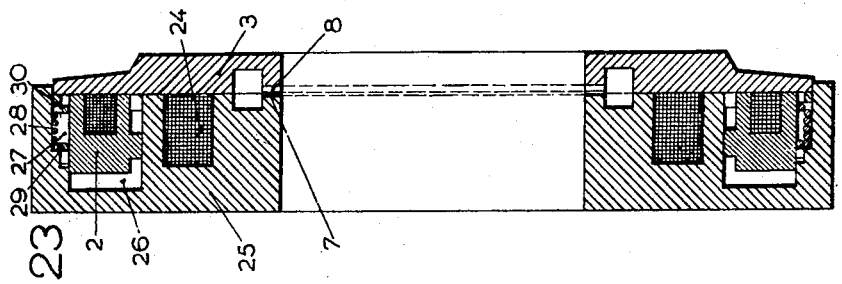
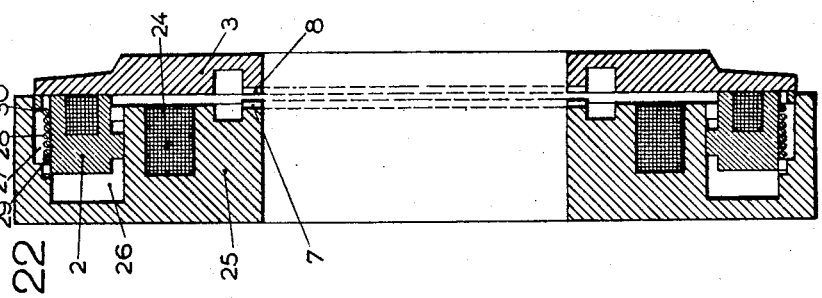
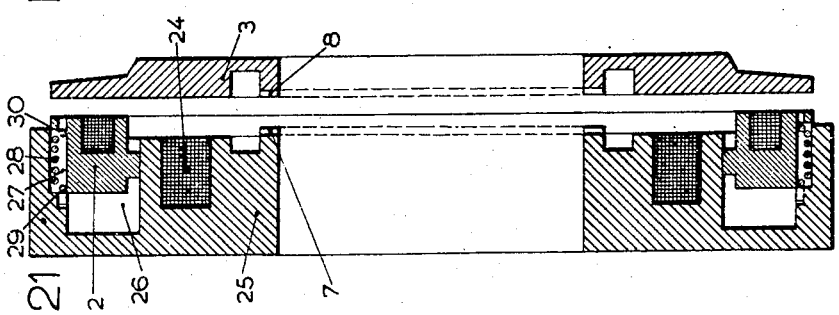
Inventor:
G. Duyck
By C. F. Hendricks
Atty Patented Feb. 5, 1952

2,584,116

UNITED STATES PATENT OFFICE 2,584,116

ELECTROMAGNETIC SYNCHRONIZER

Georges Duyck, Tanger, Morocco

Application April 2, 1948, Serial No. 18,638
In France October 22, 1947

11 Claims. (Cl. 192—53)

Gear transmissions including speed and torque change mechanism operated by electro-magnetic means are well-known. In such transmissions the electro-magnetic forces are made to operate clutching or blocking means either directly or through so-called power-boosting devices. In either case, but more particularly in that where the blocking means are directly operated by said electro-magnetic means, the electro-magnetic power required to actuate said blocking means increases in proportion with the torque to be transmitted. Thus very high torque requirements result in a very high consumption of electric energy and require heavy, large and expensive constituent parts.

It is therefore advisable in such cases to use mechanical coupling means of a suitable type such as dog-clutches or the like to couple the drive with the driven shaft, and such a coupling is adapted to be easily and smoothly operated only on condition that both clutching members are rotating at a common angular speed. A synchronizing device of some sort is therefore required.

My present invention is concerned with such a synchronizing device adapted to be automatically operated by electromagnetic means.

I am aware that electro-magnetic synchronizers have already been used or suggested in the past, but in such prior art electro-magnetic synchronizers two separate parts are provided, one for synchronizing and one for producing a clutching engagement of the cooperating clutching means, the operation of each of said separate parts being assured either by manual means or means which do not form part of the synchronizing and clutching device per se. In the present invention on the other hand the operation of the entire device is wholly automatic and the device forms a unit.

Thus, an object of my invention is to provide in an electro-magnetic transmission of the type described, electromagnetically operated means for first synchronizing and then positively mechanically clutching the input and output members of the transmission.

Another object is to provide such means which are entirely automatic in operation.

Another object is to provide such electro-magnetic synchronizing and clutching means wherein the input and output members of the transmission are adapted to be engaged and disengaged under load (power-shifting operation).

A further object is to provide an electro-magnetic transmission including synchronizing and clutching means of the type described wherein the consumption of electric power required for operating said means is particularly low, this object being attained through the use of small air-gaps adapted to be completely closed down after synchronism and coupling have been obtained.

A more specific object of the invention is to provide in an electro-magnetic transmission, synchronizing and clutching means automatically operable in a desired sequence of steps, wherein the positive clutching action between the input and output members is adapted to be made effective only after synchronism has been attained between said members.

To attain the above-described objects, the invention provides, as a further object thereof, an electro-magnetic transmission including synchronizing and clutching means which comprises: an electro-magnetic means mounted on a so-called "fixed" armature slidable axially with respect to said armature and also arranged to have a certain predetermined amount of rotational freedom in relation to said armature; another so-called "movable" armature facing said electro-magnetic means, said "movable" armature being axially movable with respect to said "fixed" armature and said electro-magnet, both said armatures having cooperating clutching means facing each other and adapted to be moved in and out of clutching engagement with each other in said axial relative movements of said movable armature; means for normally determining a smaller air-gap between said electro-magnet and said movable armature than between said magnet and said fixed armature, whereby upon energization of said magnet, said movable armature will first be attracted towards said magnet, said first magnetic attraction with said movable armature having the effect of causing a frictional rotational engagement of said movable armature with said magnet whereby to cause synchronism between said second armature and said magnet; means for preventing the electro-magnet once energized from fully axially displacing said movable armature into clutching engagement with said fixed armature until said synronism is obtained, said means being operated as a result of said limited amount of rotational freedom of said electromagnet with respect to said fixed armature and said means comprising means for blocking axial movement, which may either be frictional or positive in character; means for automatically disengaging the above-mentioned blocking means thereby allowing the movable armature to complete its axial movement into clutching engagement with said fixed armature under the magnetic attraction between said electro-magnet and said fixed armature.

In fine the electro-magnet may be said to perform the following functions:

Attract the movable armature in a first step axial movement.

Produce a frictional engagement to synchronize the rotational speed of both armatures and concurrently operate blocking means adapted to prevent the second step of axial displacement as described below until synchronization is achieved.

In a second step of axial movement, be attracted towards said fixed armature together with said movable armature which now is blocked with said electro-magnet, and thereby produce the engagement of said cooperating clutching means.

In another form, my invention may comprise: a "fixed" electro-magnet and a "movable" electro-magnet mounted for limited axial and angular displacement with respect to said fixed magnet; a common armature for both said magnets axially movable with respect thereto, said fixed magnet and said armature having co-operating clutching means facing each other; means normally defining a smaller air-gap between said movable magnet and said armature than between said fixed magnet and said armature, whereby upon energization of both said magnets, said armature is, in a first step of operation, attracted towards said movable magnet while there is not yet any attraction between said fixed magnet and said armature; said magnetic attraction between said movable magnet and said armature causing a frictional rotational torque to be exerted between said movable magnet and said armature whereby to tend to synchronize said armature with said movable magnet and, at the same time, to impart to said movable magnet said limited angular displacement of which said magnet is capable; means made operative by said limited angular displacement, to prevent said movable magnet with said armature blocked thereto, from being fully axially displaced towards said fixed magnet into clutching engagement therewith; said last-mentioned means being made inoperative as soon as said frictional torque is suppressed as a result of synchronism being reached between said armature and said movable magnet whereby said movable magnet with said armature is allowed to complete its axial movement towards said fixed magnet under the magnetic attraction between said fixed magnet and said armature, in a second step of operation, to engage said co-operating clutching means.

Some exemplary embodiments of my invention will now be described in fuller detail merely by way of illustration and not of limitation, and in reference with the accompanying drawings wherein:

Figures 1 to 12 relate to one form of embodiment.

Fig. 1 is an axial cross-section of the device in the deenergized condition of the electro-magnet;

Fig. 2 is a fragmentary cross-section on the line II—II of Fig. 1; and

Fig. 3 is a cross-section on line III—III of Fig. 2.

Figs. 4, 5 and 6 are views respectively similar to Figs. 1, 2 and 3 after the electro-magnet has been energized and the first step of operation of the device has been completed.

Figs. 7, 8 and 9 are views respectively similar to Figs. 1, 2 and 3 after the second step of operation of the device has been completed; and Figs. 10, 11 and 12 are diagrammatic cross sectional views explaining the respective conditions of both air-gaps in the three stages of operation as shown in Figs. 1, 2, 3, Figs. 4, 5, 6 and Figs. 7, 8, 9 respectively.

Figures 13 to 20 inclusive relate to a second form of embodiment:

Fig. 13 is an axial cross section of the device showing the parts as they appear for a deenergized condition of the electro-magnet along the broken line XIII—XIII of Fig. 15;

Fig. 14 is an overhead view of Fig. 13 on line XIV—XIV thereof;

Fig. 15 is a transverse cross section of the device on line XV—XV of Fig. 13;

Fig. 16 is similar to Fig. 13 but shows the relative arrangements of the parts after the first step of operation of the device;

Fig. 17 is a showing similar to Fig. 14 but relating to the relative position of the parts shown in Fig. 16;

Fig. 18 is a view similar to Fig. 15 but relating to the relative condition shown in Figs. 16 and 17;

Fig. 19 is similar to Figs. 13 and 16 but showing the relative position of the parts after the second step of operation is completed in the device;

Fig. 20 is a showing similar to Figs. 14 and 17 for the condition shown in Fig. 19.

Figures 21, 22 and 23 illustrate a third embodiment of the invention, and said figures are axial cross sections of the device, as the latter appears for the deenergized condition of the electro-magnet after the first step of operation and the second step of operation of the device repectively.

While three operative embodiments of my present invention are shown in the accompanying drawings, it is to be understood that the three forms of my invention particularly illustrated and described herein have been selected merely for purposes of exemplification and to provide a clear understanding of the operation of the invention, and by no means with the intention of restricting the scope thereof. Said three embodiments differ with respect to each other essentially in the blocking means associated with the electro-magnetic device in order to retard the engagement of the cooperating coupling means thereof before synchronism has been obtained.

The first embodiment, illustrated in Figs. 1 to 12 inclusive, relate to an aspect of the invention in which said retarding means are frictional in character, whereas the modifications shown both in Figs. 13 to 20 inclusive and in Figs. 21 to 23 inclusive show positive blocking means performing a similar function in accordance with the invention.

Now referring to the drawings, and more particularly to Figs. 1 to 12 inclusive, there is shown a single electro-magnet comprising a coil winding 1 supplied by a suitable source S housed in a body member 2. The electro-magnet 1—2 is associated with a first armature 3 rigid in rotation with a shaft 4 through a splined connection 9 allowing a suitable amount of axial displacement of the armature 3 with respect to the shaft 4. A second armature 5 shown as fixed with respect to a casing 6 is operatively connected with the face of the electro-magnet body 2 opposite from that associated with the armature 3. While for the sake of greater clarity the armature 5 is shown as stationary and it is assumed that the shaft 4 is to be immobilized with respect to said fixed casing and armature prior to coupling engagement it should be distinctly understood that the armature 5 could be provided rigid with a relatively rotatable member such as another shaft aligned with a shaft 4 and with respect to which it is required to synchronize the rate of rotation of the shaft 4 prior to effecting said coupling engagement therebetween. The coupling engagement between the shaft 4 and the fixed structure 5—6 is effected in the embodiment shown through cooperating dog-clutches 3—7 formed in suitable oppositely arranged portions of the armatures 3 and 5 respectively.

In the preferred form of the present invention said dog-clutches are of tapered or bevelled form so as to provide in operation an axial component, while the electro-magnet is provided sufficiently powerful to counteract and overcome such axial component, whereby the coupling may be suitably engaged and disengaged under power.

While the cooperating clutching means are shown as positioned radially inwardly of the electro-magnet, it will be understood that they may be arranged radially outwardly thereof.

Spring means 11 acting between the electro-magnet member 2 and the second armature 5 are adapted to urge said magnet away from said armature 5. The amount of displacement of the member 2 under the action of the spring means 11 may, if required, be limited by any suitable abutment means not shown. The spring means 11 are so arranged as to normally provide between the magnet and the main armature 3 an air-gap $e$ which is smaller than the air-gap $e'$ formed between the magnet and the fixed armature 5.

Under such conditions it will be seen that when the magnet coil winding 1 is energized with electric current, the first result thereof will be to attract the movable armature 3 which is closer to the adjacent face of the magnet member 2 than is the other armature 5 with respect to the opposite face of the member 2. This attraction may be termed the first step of operation of the device and its result is to apply the movable armature 3 against the magnetic member 2 for synchronization and axial retarding the second step of axial movement. Only then will the second step of operation set in, i. e. a displacement of the unit 2—3 towards the fixed armature 5, the result of this movement being the coupling engagement between the dogs 7—3. It is necessary however to retard or delay the setting in of said second stop of operation until the armature 3 is rotating at the same angular rate as the armature 5 and the structure 6. In the embodiment shown the latter angular rate is of course, zero.

To thus retard or delay said axial movement of the assembly 2—3 axially towards the armature 5, according to the invention, means are provided which are now to be described.

The electro-magnet 1—2 is mounted so as to be angularly rotatable a limited amount with respect to the fixed armature 5. Thus, after the electro-magnet 1—2 has attracted the armature 3 (first step), the rotation of the armature 3 is adapted, through the frictional engagement between the adjacent sides of the members 2 and 3, to rotate the magnet 1—2 in the same direction as 3. As soon as the armature 3 has been synchronized with the armature 5, such synchronization being, in the exemplary form shown, manifested by a relatively stationary condition of the armature 3, the frictional force urging the magnet 2 to said rotated condition thereof is obviously suppressed and restoring spring means $2a$ and $5a$ in engagement with projections $2b$ and $5b$ respectively of the magnet member 2 and of the member 14 integral with the armature 5; said spring means, it will be understood, are arranged to act tangentially in a suitable direction between the members 2 and 5, tend to restore the magnet member 2 to its initial angular position with respect to the fixed armature 5. According to the invention, and in all of the modifications thereof shown in the attached drawings, it is this angular motion of the magnet with respect to the fixed armature under the frictional action of the movable armature resulting from the attraction of the latter in the first step of operation of the device, which is made to operate the retarding means of one type or another provided for delaying the second step of operation, i. e. axial movement of the magnet and movable armature as a unit towards the fixed armature, until said movable armature is rotating substantially at the same speed as the fixed armature (that is, in the form shown, until said movable armature has stopped rotating).

In the embodiment of the invention shown in Figs. 1 to 12 inclusive, the fixed armature 5 carries a generally circumferential supporting member 14 secured thereto as through bolts or rivets 19 or otherwise. The member 14 at circumferentially spaced points thereof is suitably formed, as shown in Figs. 2 and 3 for instance, with housing portions 16 each of which supports a pin 13 extending in a plane transverse of the general axis of the device. Each of the pins 13 has slidably mounted thereon two sets of friction elements or plates 12 and 15 respectively. The plates of the set 12 are slidable along the pin 13 between abutting shoulders of said pin and therefore axially rigid with the armature 5. The plates 15, on the other hand, which are interspersed as shown with the plates 12 along the pin 13, are mounted on said pin through elongated slots 18 so as to be movable a limited extent axially of the device in addition to being slidable along the pin 13. Moreover the plates 15 are made rigid with the magnet member 2 for the axial movements of said magnet while allowing said magnet to rotate a limited angular extent with respect thereto through abutting shoulders of a stirrup-like housing 16. The entire assembly of friction plates 12 and 15 are enclosed in said stirrup-like housing portion 16 rigid with the magnet member 2 and suitably apertured to be fully slidable along the pin 13. The above-described arrangement operates as follows, with reference to Figs. 1 to 12.

Prior to energization of the magnet coil 1, the stirrup member 16 of the magnet member 2 is located centrally of the pin 13 (Fig. 2) and the alternately arranged plates 12 and 15 are not in frictional engagement with each other (Figs. 2 and 3). The springs $2a$ and $5a$ are in a rest position symmetrical with respect to the projection $2b$ of the magnet member 2. The fixed armature 5 and the magnet 1—2 are both stationary (for example) while the movable armature 3 is rotating together with the shaft 4, for instance in a clockwise direction as seen in Figs. 2 and 3. The relative dimensions of the air-gaps $e$ and $e'$ due to the action of spring means 11 are as shown in Fig. 10. As energizing current is supplied to the magnet coil 1, the magnetic path of lesser resistance is through the smaller air-gap $e$, and as a result the movable armature 3 is attracted and axially moves along the splined connection 9 thereof until it engages the adjacent side of the magnet member 2 (see Fig. 4). The result of the frictional engagement between the members 2 and 3 is to cause the magnetic member 2 to be rotated in the same direction as that of the rotation of the member 3 (i. e. clockwise as in Figs. 2, 3) to the angular extent allowed by the friction plates 12 and 15 and against the action of the restoring spring means 2a and 5a. The stirrup portion 16 of the member 2 is thereby shifted clockwise along the pin 13 (as shown in Fig. 5) thereby clamping the various plates 12 and 15 against each other between one side of the stirrup 16 and the oppositely related shoulder 13a of the pin 13. This frictional engagement results in arresting any further axail movement of the members 2—3 towards the armature 5 to engage the clutching means 7—8. This was the so-called first step of operation of the electro-magnetic device and the resulting relative condition of the elements is that shown in Figs. 4, 5, 6 and 11.

Now the frictional engagement between the members 2 and 3 due to magnetic attraction therebetween finally results in bringing about synchronism between the respective speeds of rotation thereof (this in the example illustrated means that the member 3 is brought to a stop), and at that time the member 2 will no longer be subjected to a driving torque from the armature 3, and said restoring spring means thereof will consequently pull the magnetic member 2 back to its initial angular position relative to the fixed armature 5. The whole arrangement including the pin 13, stirrup 16 and sets of plates 12 and 15 then resumes a centered relative condition as before (as may be seen by comparing Figs. 8 and 9 with Figs. 2 and 3 respectively), the plates being disengaged from mutual frictional contact and no longer preventing an axial movement of 2—3 towards 5. Such movement is then caused by the magnetic attraction between the magnet 2 and fixed armature 5, which is now allowed to be effective through the air-gap e', whereby the clutching dogs 8 of the movable armature 3 are brought into engagement with the dogs 7 of the fixed armature 5. The second step of operation of the device has now been completed, and the relative positions of the parts is that shown in Figs. 7, 8, 9 and 12.

I will now describe the alternative shown in Figs. 13 to 19 inclusive. In view of the essential similarity in the general operation of the invention in its various modifications, the ensuing embodiments will be described somewhat more briefly than the first-disclosed one relating to Figs. 1 to 12. Now, referring to Figs. 13 to 19, there is shown an electro-magnetic winding 1 enclosed in a magnet body or member 2, which as before is slidable axially of the structure and also movable angularly a limited extent therein. On one side of the magnetic body 2 is arranged the movable armature 3 rotatable with the driven shaft (not shown) and movable axially with respect thereto and on the opposite side of 2 is the fixed armature 5 which may for instance be rigid with a casing structure 6. The armatures 3 and 5 are provided with complementary clutching means 8 and 7 respectively. Spring means 11 normally urge the magnetic member 2 to an axial position defining a smaller air-gap with the armature 3 than with the armature 5 (air-gaps e and e' respectively). The means for delaying the second step of axial movement until synchronism is attained between 2 and 3 are herein as follows. The magnetic member 2 and the fixed armature 5 are formed with cooperating retractible abutting or spacing means herein shown as including a projection 20 extending axially from the armature 5 towards the member 2 and cooperating with a recess 21 formed in the member 2. The relative arrangement of the means 20—21 is such as normally not to prevent the member 2 from moving into engagement with 5, because the projection 20 is then retracted within the recess 21. When, however, the member 2 is, as described in connection with Figs. 1 to 12, rotated with respect to the fixed armature 5 due to the frictional driving action of the armature 3, the abutment 20 is angularly brought opposite to a solid portion of the member 2 and axial movement of 2—3 towards 5 into clutching engagement therewith through 7—8 is prevented until said frictional driving torque is suppressed due to synchronism between 3 and 2 being reached, whereupon the member 2 is restored back to the initial angular position thereof with the projection 20 opposite to the recess 21. This restoring effect is brought about by tangentially-acting springs 22 arranged at spaced points circumferentially of the members 2 and 5 and adapted to be compressed (as shown in Fig. 18) when the member 2 is rotated. Reference numerals 23 illustrate balancing springs also acting between the members 2 and 5 in opposition to the springs 22 and in counterbalancing relationship therewith, to maintain the member 2 in an intermediate or centered position with respect to the armature 5.

Summarizing the operation of this alternative of the invention it may be stated that in the de-energized condition of the electro-magnet the relative positions of the parts are as shown in Figs. 13, 14 and 15, with the magnetic member 2 axially spaced both from the movable and the fixed armatures 3 and 5 (albeit by unequal distances e and e' respectively) and with the member 2 held by the joint action of the spring means 22—23 in a position such that the projections 20 are opposite the related recesses 21 without engaging the same; after the magnet coil 1 is energized, movable armature 3 is attracted towards magnetic member 2 closing the gap e and causing the member 2 to be rotated in the same direction as 3 a limited angular extent, while compressing the springs 22, the angular position of 2 relative to 5 then being such as to bring projection 20 out of alignment with recess 21 to thus prevent further axial movement of 2—3 towards 5; this is the condition illustrated in Figs. 16, 17 and 18. Next, synchronism finally obtaining between 3 and 2, member 2 is allowed to be rotated back to its centered angular position by the springs 22—23, restoring alignment between 20 and 21 and allowing 2—3 to be bodily magnetically attracted towards fixed armature 5, the dogs 7 and 8 clutchingly engaging each other (Figs. 19 and 20).

Now turning to the third and last exemplary embodiment, as illustrated in Figs. 21, 22 and 23 of the appended drawings, the general arrangement of the cooperating electro-magnetic means therein shown is somewhat different from the first two forms shown, in that rather than having as before an electro-magnet 1—2 arranged between two armatures 3 and 5, there are provided two electro-magnets and but one armature. The essential operational principle of the device however, as will presently be demonstrated, remains substantially unchanged. A first electro-magnet comprises a magnetic coil 24 enclosed in a magnetic body 25 rigid with the casing (or other structure) (not shown) corresponding with the casing 6 of the previously shown embodiments. A recess 26 is formed in the member 25 and a second magnetic body 2 having a magnetic coil therein is mounted for axial displacement and limited angular rotation in said recess 26. A common armature member 3 for both magnets 24—25 and 1—2 is provided, being connected with a rotatable shaft (not shown) through a splined connection (not shown) as in the precedingly described modifications. Magnetic member 25 and armature 3 are formed with cooperating clutching means 7 and 8 respectively. The magnetic member 25 is so formed as to define around the member 2 slidable therein an annular recess 27 in which is arranged a large diameter coil spring 28 the ends of which are respectively attached to suitable points of magnetic members 25 and 2 as at 29 and 30. The spring 28 serves a twofold function. In the first place, it urges the magnet 2 away from or out of the magnet member 25 so as to define a smaller air-gap $e$ between 2 and 3 than the air-gap $e'$ between 25 and 3; in this respect the spring 28 may be said to play the part of the spring means 11 in both preceding embodiments. But in addition the characteristics and the arrangement of the spring 28 are such that when the intermediate or movable magnet 2 is rotated by the frictional torque exerted thereon by the armature 3 at the end of a first step of operation (after magnet 2 has attracted armature 3), the spring 28 is tightened around the outer periphery of the member 2 with the successive turns thereof in juxtaposed relation, thereby preventing any further axial movement of 2—3 towards 25 (see Fig. 22). After 3 has been brought into synchronism with 2, no further frictional torque being applied to 2, the spring 28 is allowed to resume its natural or expanded condition. It will be readily understood from a study of the figures that the assembly 2—3 is then allowed to move axially further inward of the member 25 to bring about the coupling engagement between clutch means 7 and 8 (second step of operation: Fig. 24).

It will be understood that the three different modifications of the invention shown are to be taken merely as examples. Many other alternatives may be devised by those familiar with the art, whether by combining together in different ways the constituent elements of the devices shown, or by resorting to entirely different, though functionally equivalent means to achieve the desired results. It is therefore to be distinctly understood that the invention is only restricted by the basic principles thereof as defined hereinabove and in the ensuing claims.

In addition to the previously set forth advantages of the device according to the invention, it may further be stated that an electro-magnetic transmission equipped with my improved synchronizing and coupling means assures high flexibility in operation, allowing, as already stated, gear-shifting under power. The magnitude of the energizing current may be adjusted, either manually or automatically, and may be varied, during to the shifting operation, according to any desired law of variation. Since there is no loss circuit for the magnetic field once both air-gaps are closed down, the holding current used may be very small, thereby greatly reducing the overall consumption of electric power.

What I claim is:

1. A synchronous coupling device between two relatively rotatable members which comprises in combination: two magnetic armatures each rigid in rotation with one of said members and cooperating coupling means on each of said armatures, electro-magnetic means adapted when energized to axially displace at least one of said armatures to cause synchronization and to cause coupling of said cooperating means, blocking means for retarding said coupling axial displacement of said armature until said members are rotating at the same speed, and means for energizing said electro-magnetic means.

2. A synchronous power coupling device between two relatively rotatable members which comprises in combination: an electro-magnet rigid in rotation with one of said members, an armature rigid in rotation with the other one of said members, cooperating coupling means rigid with said magnet and said armature respectively, a second electro-magnet intermediate said first electro-magnet and said armature axially movable a limited extent therebetween, adapted when energized to produce a synchronization between said members, and said first electro-magnet being adapted when energized to axially displace said second magnet together with said armature towards itself to engage said coupling means, and blocking means for retarding said coupling axial displacement until said synchronization is attained.

3. A synchronous coupling device between two relatively rotatable members which comprises in combination: two magnetic armatures each rigid in rotation with one of said members and one of which is axially movable towards and away from the other one; cooperating coupling means on each of said armature; an electro-magnet arranged between said armatures and axially movable a limited extent therebetween and normally defining a narrower air-gap with said movable armature than with said other armature and adapted when energized to first attract said movable armature to cause the same to move towards said other armature in a first axial movement while at the same time frictionally synchronizing the relative speed of rotation of said movable armature with respect to said other armature and adapted thereafter to move in a second axial movement as a unit with said movable armature towards said other armature to cause coupling cooperation between said coupling means, and blocking means to retard said second-mentioned axial movement until positive synchronism between said members is obtained.

4. A synchronous coupling device as in claim 3 wherein said means for retarding said second unitary axial movement of said electro-magnet together with said movable armature towards said other armature comprises positive operated blocking means.

5. A synchronous coupling device as in claim 3 wherein said means for retarding said second unitary axial movement of said electro-magnet together with said movable armature towards said other armature comprises frictionally operated blocking means.

6. A synchronous power coupling device between two relatively rotatable members which comprises in combination: two magnetic armatures each rigid in rotation with one of said members and one of which is axially movable towards and away from the other one; cooperating coupling means on each of said armatures; an electro-magnet arranged between said armatures axially movable into contact engagement with said other armature and also angularly movable a limited extent, said magnet normally defining a narrower air-gap with said movable armature than with said other armature, and adapted when energized to retard, in a first stage of operation, the relative speed of rotation of said movable armature with respect to said other armature, said magnet being caused in this stage of operation to be rotated said limited angular extent in the direction of rotation of said movable armature while at the same time causing said movable armature to move towards said other armature and adapted when said magnet is so rotated to frictionally engage cooperating means in said first armature to retard any further movement of said movable armature with said electro-magnet towards said first armature until positive synchronism has been attained between said armatures, whereupon said electro-magnet with said movable armature is, in a second stage of operation, axially displaced as a unit towards said other armature thereby causing coupling engagement between said cooperating coupling means.

7. A synchronous power coupling device as in claim 6 wherein said electro-magnet is spring-urged to a position wherein a narrower air-gap is defined with said movable armature than with said other armature.

8. A synchronous power coupling device between two relatively rotatable members which comprises in combination: two magnetic armatures each rigid in rotation with one of said members and one of which is axially movable towards and away from the other one; cooperating coupling means on each of said armatures; an electro-magnet arranged between said armatures axially movable into contact engagement with said other armature and also angularly movable a limited extent, said magnet being normally spring-urged to a position in which a narrower air-gap is defined thereby with said movable armature than with said other armature; a set of friction plates associated with said magnet and a set of friction plates associated with said other armature, some of said plates, in at least one of said sets, being angularly movable a limited extent with respect to its associated member, the arrangement being such that when said magnet is rotated said limited angular extent, both said sets of friction plates come into mutual friction engagement thereby preventing any further axial displacement of said magnet, said magnet being adapted when energized to retard in a first stage of operation the relative speed of rotation of said movable armature with respect to said other armature and said magnet in said first stage of operation being caused to be rotated said limited angular extent in the direction of rotation of said armature while at the same time causing said movable armature to axially move towards said other armature, whereupon said friction engagement of said plates prevents any further axial displacement of said magnet until positive synchronism has been reached between said movable and said other armature, whereupon, in a second stage of operation, said friction between said sets of plates being suppressed, said magnet together with said movable armature is axially moved as a unit towards said first armature to produce coupling engagement between said cooperating coupling means.

9. A synchronous power coupling device between two relatively rotatable members which comprises in combination: two magnetic armatures each rigid in rotation with one of said members and one of which is axially movable towards and away from the other one; cooperating coupling means on each of said armatures; an electro-magnet arranged between said armatures axially movable into contact engagement with said other armature and also angularly movable a limited extent; first spring means axially urging said magnet to a position in which a narrower air-gap is defined thereby with said movable than with said other armature; cooperating abutting means respectively on said magnet and said other armature adapted when said magnet is in the non-rotated position thereof to permit the axial displacement of said magnet towards said other armature and when said magnet is in said rotated position thereof to prevent such axial displacement, said magnet being adapted when energized to retard in a first stage of operation the relative rotation of said movable armature with respect to said other armature and being adapted as a result of said retarding action to itself be rotated said limited extent; second spring means acting tangentially between said magnet and said other armature adapted to be compressed in said limited rotation of said magnet, said second spring means being adapted after synchronization is attained between said magnet and said movable armature and said retarding action is therefore suppressed, to cause said magnet to be rotated back to its initial angular position whereupon said abutting means will allow, in a second step of operation, a unitary axial movement of said magnet with said movable armature towards said other armature to allow coupling engagement between said cooperating coupling means.

10. A synchronous power coupling device as in claim 2 wherein said second electro-magnet is angularly movable a limited extent within said first magnet and wherein said retarding means comprise a coil spring co-axial with said coupling device and having the respective ends thereof connected with each of said magnets, said coil spring being coiled in an annular space defined between an inner surface of said first magnet and an outer surface of said second magnet, and being adapted in said relatively rotated position of said second magnet to be contracted around said outer surface of said second magnet with the successive turns thereof in mutually abutting relationship to thereby prevent any axial displacement of said second with respect to said first magnet, and adapted, once said synchronization between said second magnet and said armature attained, to resiliently restore said second magnet to said non-rotated relative position thereof with respect to said first magnet, whereby the tension of said spring is released and said spring may expand against said outer surface to thereby allow said second magnet together with said armature to be axially displaced towards said first magnet into coupling engagement therewith.

11. A synchronous power coupling device as in claim 8 wherein spring means are provided to positively disengage said friction plates upon synchronism being reached between both said members.

GEORGES DUYCK.

REFERENCES CITED

The following references are of record in the file of this patent:

UNITED STATES PATENTS

| Number | Name | Date |
| --- | --- | --- |
| 754,291 | Eastwood | Mar. 8, 1904 |
| 2,246,774 | Adney | June 24, 1941 |